Nov. 10, 1959 — K. A. KLINGLER — 2,912,012
MULTI-WAY PIVOTED VALVE UNIT
Original Filed June 28, 1956 — 2 Sheets-Sheet 1

Inventor
Karl A. Klingler
by Parker & Carter
Attorneys

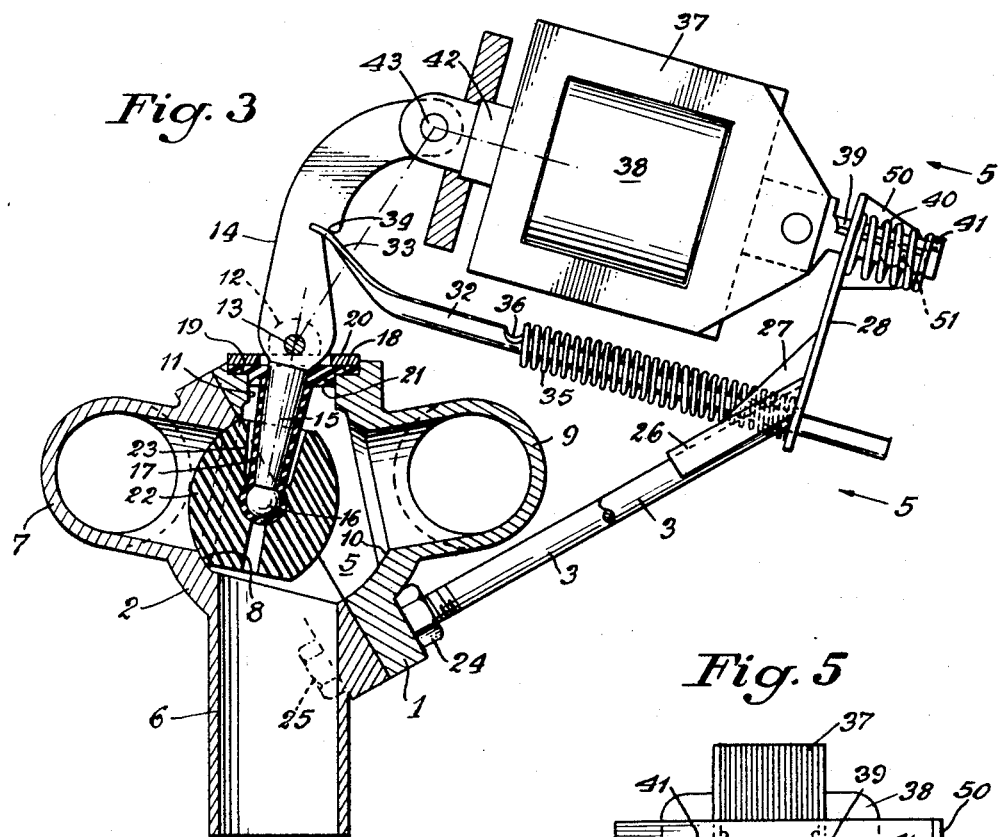
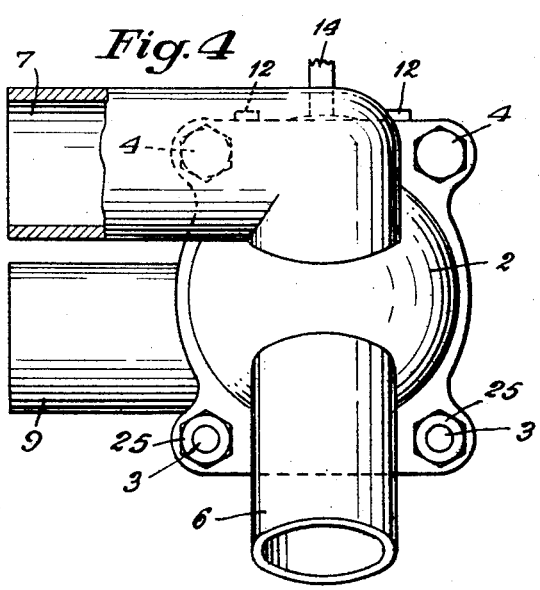
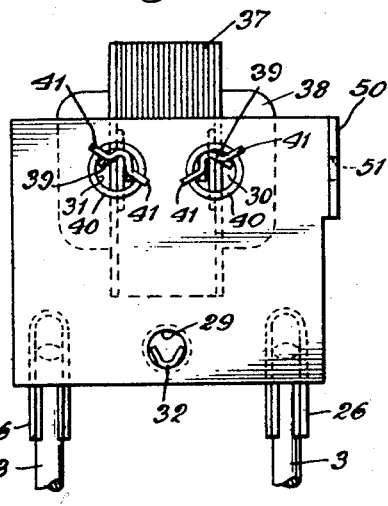

United States Patent Office 2,912,012
Patented Nov. 10, 1959

2,912,012

MULTI-WAY PIVOTED VALVE UNIT

Karl A. Klingler, Naperville, Ill.

Original application June 28, 1956, Serial No. 594,646, now Patent No. 2,852,947, dated September 23, 1958. Divided and this application June 7, 1957, Serial No. 664,215

1 Claim. (Cl. 137—625.44)

My invention relates to a new and useful improvement in multi-way pivoted valve unit and has for one object to provide a suitable valve housing and valve unit wherein a minimum of obstruction to flow of liquid therethrough may be achieved.

Another object of my invention is to provide a valve housing wherein the path of the liquid flowing therethrough will to a minimum extent be subjected to eddy currents and other resistance.

I have illustrated my invention in connection with a two-way valve though it could equally well be used in connection with other types of valve.

I have illustrated my invention as applied to a ball valve though obviously other valves might be used.

Any suitable actuating means may be used for actuating the valve. The actuating means forming the subject matter of my co-pending application, of which this application is a division, Serial No. 594,646, filed June 28, 1956, which has matured into Patent No. 2,852,-947, is especially well adapted for that purpose.

My invention is illustrated more or less diagrammatically in the accompanying drawings, wherein—

Figure 3 is a section similar to Figure 2 showing the parts in the position assumed when the motive element has completed its actuating excursion;

Figure 4 is a side elevation of the valve housing as shown in Figure 1;

Figure 5 is a view taken in the direction of the arrows 5 showing end elevation of Figure 1.

Like parts are indicated by like characters throughout the specification and drawings.

Figure 1:
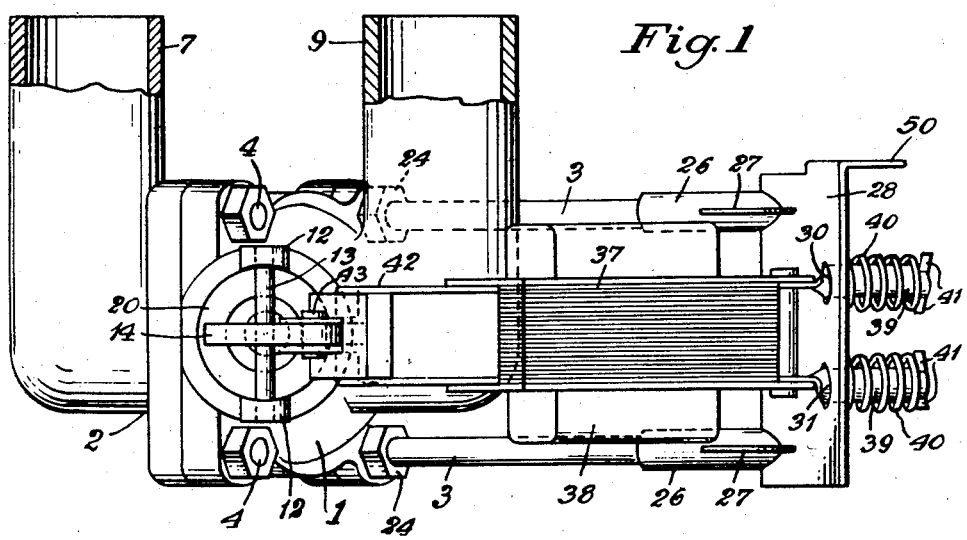
Figure 1 is a plan view of the valve housing and actuating mechanism.

1, 2 are two sections of a valve housing held together by studs 3 and bolts 4. The two sections define a valve chamber 5. Inlet tube 6 integral with the housing section 2 defines the usual inlet port communicating with the valve chamber 5. An exhaust tube 7 integral with housing section 2 defines an exhaust port encircled by an exhaust valve seat 8. An exhaust tube 9 integral with the housing section 1 defines an exhaust port encircled by an exhaust valve seat 10. The tubes 7 and 9 are side by side and generally parallel and in this case generally at right angles to the intake tube 6 but they and the exhaust ports defined by them are so disposed that the axis of the port in each case makes an obtuse angle with the axis of the intake sleeve.

The housing 1 is apertured as at 11. On each side of the aperture are outwardly extending lugs 12 drilled out to furnish bearings for the pivot pin 13 on which is pivotally mounted a valve actuating lever 14 terminating at its inner end in a valve supporting finger 15 having an enlarged head 16 and enclosed by a rubber or elastomeric sleeve or sack 17 closed at its inner end, extending outwardly toward the pivot 13, flanged at 18 to rest against the annular sealing surface 19 concentric with the aperture 11. A washer 20 rests upon the flange 18 and is of such thickness that when the pin 13 is in place, it engages the upper face of the washer 20, compresses it against the flange 18 and holds the flange seated on the sealing surface 19. A thin flexible fin 21 extends downwardly from the flange 18 to rest against the wall of the housing so that hydraulic pressure forces the fin 21 against the housing and makes a tight seal.

Enclosing the inward end of the finger 15 is a ball like valve 22 penetrated by the enlarged head 16 and thereby held in place on the finger. The valve is recessed as at 23 so that while the head 16 snugly engages the ball valve, the valve is free to rock on the finger 15 to adjust itself in position for proper contact with the valve seats 8 or 10 respectively, as the lever 14 is angularly displaced.

It will be noted that when either one of the valve seats is engaged by the ball-like valve which in this case is actually a cylinder with generally spherical ends, the angle of flow from the intake through the valve chamber and out through the open port is such that a minimum resistance to flow by eddy currents is interposed because of the fact that the axes of the cylinder 6 and the ports 8 and 10 as above pointed out are inclined to one another on obtuse angles.

The sole purpose of the bolts 4 is to hold the two halves of the valve housing together. Studs 3 have a dual purpose. Each of the studs is threaded at its lower end. A nut 24 is threaded thereon and welded in place and serves as an abutment so that when the nut 25 is tightened up, the two halves of the housing are drawn together. Each stud 3 at its outer end is welded to a semi-circular trough-like member 26 which is flanged and reinforced at 27 to support an abutment plate 28, which plate is apertured at 29, 30 and 31.

32 is a lever actuating push rod of generally V-shaped cross section as indicated in Figure 5 and flattened at 33 and notched to engage the notch 34 in the lever 14. The push rod 32 is free to reciprocate with respect to the plate 28, passing through the aperture 29. The compression spring 35 encircling the push rod 32 abuts on fingers 36 bent outwardly from the opposite sides of the channelled rod 32 at one end and at the other end on the plate 28 so that the spring 35 biases the valve lever and finger in a counter clockwise direction to maintain the ball valve 22 normally seated on the exhaust valve seat 10.

The solenoid coil yokes 37 support a solenoid coil 38 and carry channelled guide members 39 which penetrate respectively the apertures 30 and 31 in the plate 28. Springs 40 encircle the members 39 abutting at one end on the plate 28 and at the other end on fingers 41 bent outwardly from the channeled shaped members 39 so as to bias the solenoid toward the plate 28.

42 is a solenoid plunger associated with the solenoid and pivoted at 43 on the lever 14 so that when the solenoid is energized, the plunger 42 may be drawn to the right compressing the spring 35 and causing the ball 22 to seat upon the valve seat 8 leaving the valve seat 10. This takes place without any change in the position of the solenoid yokes because it takes more power to compress the springs 40 than it does to compress the spring 35. However, as soon as the valve 22 is seated on the seat 8 which occurs before the end of the solenoid excursion, the power exerted by the solenoid then compresses the springs 40 to permit the solenoid plunger to make its complete excursion.

Figure 2:
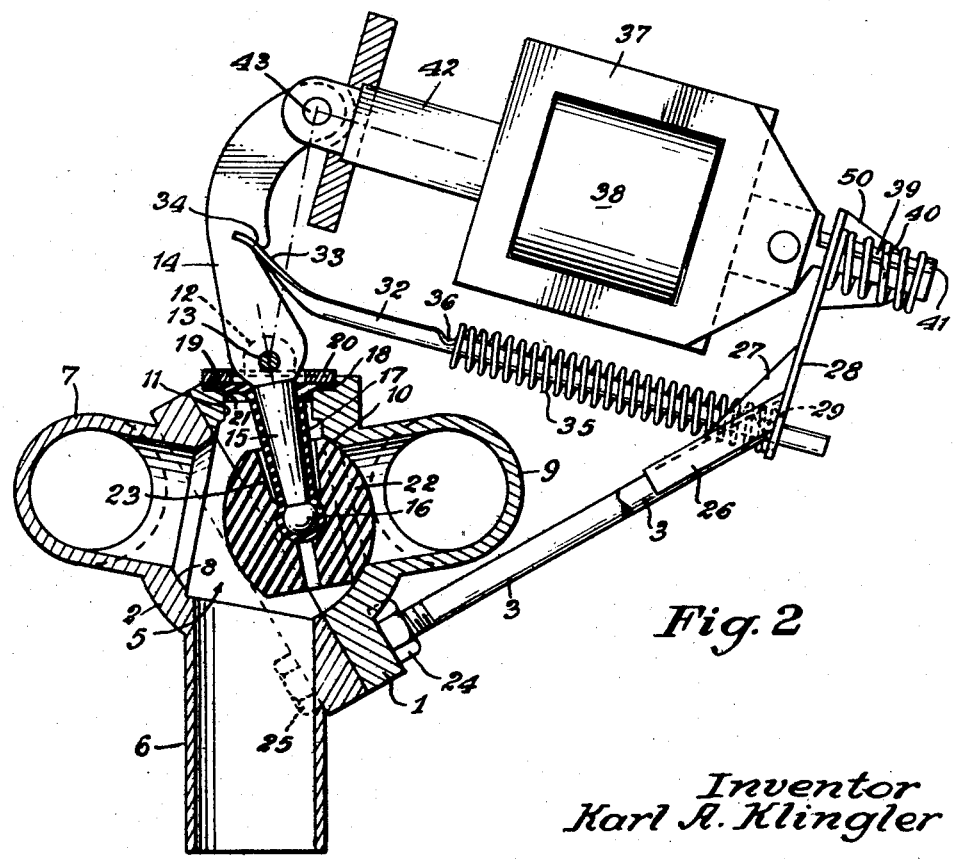
Figure 2 is a longitudinal section through Figure 1 showing the parts in the position assumed when the solenoid or motive element is idle.

In the position shown in Figure 2 with the solenoid not energized, the line of pull along the axis of the solenoid plunger is generally perpendicular to the effective lever arm between pivot points 13 and 43 so that at the beginning of solenoid operation when the plunger is furthest out and so its effect is at the minimum, the leverage is applied through a ninety degree angle. As the plunger goes further toward seating, the angle becomes more obtuse so that the advantage of the leverage decreases as the plunger approaches the point of maximum pull.

At the same time as the lever 14 rotates in a clockwise direciton, the resistance of the compression spring 35 increases and the further lever 14 rotates the greater the resistance of the spring 35 until the valve body 22 seats against the seat 8 and can go no further. This amounts to a stop limiting the angular travel of the lever 14. Thereafter since the plunger has not yet seated and needs to seat to complete its cycle, the springs 40 are now compressed and the solenoid 38 moves toward the pivot point 43. This is possible because the strength of the springs 40 is greater than the strength of the spring 35 and until the solenoid has urged the lever 14 as far as it can go, compressing the spring 35, the springs 40 remain in position and the movement of the solenoid against their compression only takes place after the valve has seated in the new position and rotation of the lever 14 has been brought to a stop.

During this part of the operation, because of the previous angular displacement in a clockwise direction of the lever 14, the relationship between the effective lever centering at 13 in opposition to the push rod 32 has now changed so that there is an obtuse angle between that lever and the line of force of the spring 36 so as to reduce the power of that spring in opposition to the power of the solenoid.

An ear 50 extends from the abutment plate 28, is apertured at 51 and is generally in line with one side of the valve housing.

I have used the word ball valve as applied to the valve member 22. I want it understood that this term is used in the broadest possible sense as a valve which operates as ball valves are in the habit of operating without reference to any particular shape or contour.

The use and operation of my invention are as follows:

It is important that the seating of the valve in either of its two positions be accurate and snug to insure against leakage. Therefore the ball is loosely mounted on the finger. The finger holds it in position but because the valve is free to rock through a limited extent on the ball joint between it and the finger, the finger can adjust itself to inaccuracy. It can even adjust itself to obstructions which might be caught between the valve ball and the seat.

It is important to accomplish rapid and smooth flow of the fluid, usually water, controlled by the valve so that a minimum of eddy currents, a minimum of obstructions be met by the liquid. The particular angular arrangement of the planes of the two valve seats lends itself well to a smooth flow of the liquid. The liquid does not have to make a right angle turn. It makes a gradual change in direction and so tends to flow freely and smoothly. This is especially important in connection with such appliances as washing machines where rapid filling and unfilling is of great importance.

The particular arrangement results in the use of a distribution valve in a valve housing or chamber where a minimum change in effective cross sectional area of the stream of liquid results, thus minimizing eddy currents and maintaining smooth flow.

I claim:

In a two-way valve, a two-part valve body enclosing and forming a valve chamber, one housing part being apertured to receive a valve actuating member an intake duct integral with and extending from the other housing part in general alignment with the aperture, the axes of said duct and aperture being parallel, the two housing parts being separable along a plane inclined to the axis of the intake duct and means for holding the two parts together, exhaust ducts extending in opposite directions from the valve chamber each integral with one of the housing parts, having opposed valve seats one of the valve seats being located adjacent the chamber in one of the body portions, the other valve seat being located opposite the first in the other body portion of the chamber, an elastomeric flanged sleeve closing the aperture and extending into the valve chamber, a valve actuating finger extending inwardly through the aperture into the sleeve, a ball valve carried by the inboard end of the finger, a pivot support for the finger, on the housing part above the sleeve flange, the ball valve being supported by the finger for movement across the plane of separation of the valve parts between the valve seats.

References Cited in the file of this patent

UNITED STATES PATENTS

| | | |
|---|---|---|
| 752,439 | Coryell | Feb. 16, 1904 |
| 787,565 | Coryell | Apr. 18, 1905 |
| 913,400 | Kimball | Feb. 23, 1909 |
| 1,065,467 | Piel | June 24, 1913 |
| 2,035,747 | Harris | Mar. 31, 1936 |
| 2,188,216 | Beecher | Jan. 23, 1940 |
| 2,368,120 | Downey | Jan. 30, 1945 |
| 2,494,091 | Harris | Jan. 10, 1950 |
| 2,694,414 | Seyferth | Nov. 16, 1954 |

FOREIGN PATENTS

| | | |
|---|---|---|
| 106,847 | Germany | Nov. 11, 1899 |